March 29, 1966 — O. KUMMER — 3,243,699
MEASURING SET WITH COMPENSATION FOR STANDARD ATTENUATOR CALIBRATION ERRORS
Filed May 5, 1961 — 2 Sheets-Sheet 1

INVENTOR.
O. KUMMER
BY
ATTORNEY

March 29, 1966  O. KUMMER  3,243,699
MEASURING SET WITH COMPENSATION FOR STANDARD
ATTENUATOR CALIBRATION ERRORS Filed May 5, 1961  2 Sheets-Sheet 2

INVENTOR.
O KUMMER
BY
ATTORNEY

United States Patent Office 3,243,699
Patented Mar. 29, 1966

3,243,699
MEASURING SET WITH COMPENSATION FOR STANDARD ATTENUATOR CALIBRATION ERRORS
Oscar Kummer, Basking Ridge, N.J., assignor to Bell Telephone Laboratories, Incorporated, New York, N.Y., a corporation of New York
Filed May 5, 1961, Ser. No. 107,956
16 Claims. (Cl. 324—57)

This invention relates to a transmission measuring set in which a dynamic calibration correction is provided for automatically eliminating from electric circuit measurements the errors which are due to discrepancies between actual and indicated characteristics of an adjustable circuit element.

It is often desirable to measure the characteristics of a circuit device, such as a transistor, in the frequency environment in which the device may be used. However, the measurement problem often presents difficulties which are not normally troublesome in the particular circuit in which a tested device will be used. Measuring circuit elements may bring into play new problems of loss and phase which adversely affect measurements on the device under test. These measuring problems must be solved in order to obtain accurate results.

In one high frequency measuring scheme, a transistor under test and a standard adjustable attenuator are connected in separate circuit paths which are subjected to similar signals. If the paths are otherwise balanced, the attenuator may be adjusted to balance attenuation through the transistor; and the transistor attenuation may be read from dials on the attenuator. Similar techniques may be used to determine certain other transistor characteristics. However, even the best adjustable attenuators may have discrepancies between actual in-circuit attenuation and attenuation indicated on the dials of the attenuator. Oftentimes such errors are so small that they can be corrected only by adding custom designed resistances to the attenuator.

If one is able to obtain resistors of precisely the right magnitude for performing the needed correction in a standard attenuator, it may still be difficult to make the corrections when the attenuator must be used at high frequencies. The reason for the difficulty is that the insertion of additional resistance usually changes other characteristics of the standard attenuator which are of importance in making the necessary measurements.

The obvious solution to this difficulty, and the one solution which is most generally employed, is to provide with each adjustable attenuator a calibration chart to which the operator of the instrument may refer in order to convert dial indications into actual in-circuit attenuation. This sort of expedient is subject to considerable potential human error and is, therefore, not desirable for applications in which a large number of measurements are to be made.

It is, therefore, one object of the invention to reduce the possibilities of human error in correcting electric circuit measurements for calibration errors in measuring circuit elements.

It is another object to correct electric circuit measurements for calibration errors of adjustable circuit elements by means which are both convenient to arrange and automatic in operation.

An additional object of the invention is to correct automatically for calibration errors of adjustable circuit elements without affecting the characteristics of those elements.

These and other objects of the invention are realized in an illustrative embodiment of a balancing type of measuring circuit. An attenuator with known errors in dial calibrations is connected in a high frequency portion of the measuring circuit and adjusted in steps to obtain a predetermined indication on an output meter. A plurality of impedances having magnitudes corresponding to the necessary calibration corrections at the respective adjustment steps of the attenuator are selectively connected in circuit with the meter in a low frequency portion of the over-all measuring circuit. The in-step selection of the impedances dynamically and automatically takes into account calibration errors in the adjustable attenuator. When the desired meter indication is obtained, the attenuation indicated by the attenuator dials is exactly the in-circuit attenuation being measured.

It is one feature of the invention that calibration corrections for an adjustable standard attenuator in a measuring circuit are automatically and electrically effected in the circuit so that in-circuit attenuation may be read directly from attenuator dials without further correction.

Another feature is that dynamic calibration correction means are provided in a low frequency portion of a measuring circuit to offset the effects of calibration errors in an adjustable calibrated circuit element in a high frequency part of the measuring circuit.

A further feature of the invention is that the indication provided by a measuring circuit is automatically corrected for calibration errors in an adjustable circuit element without affecting the in-circuit characteristics of that element.

A complete understanding of the invention and its various features and advantages may be obtained upon a consideration of the following detailed description and the appended claims taken in connection with the attached drawing, in which:

Figure 1:
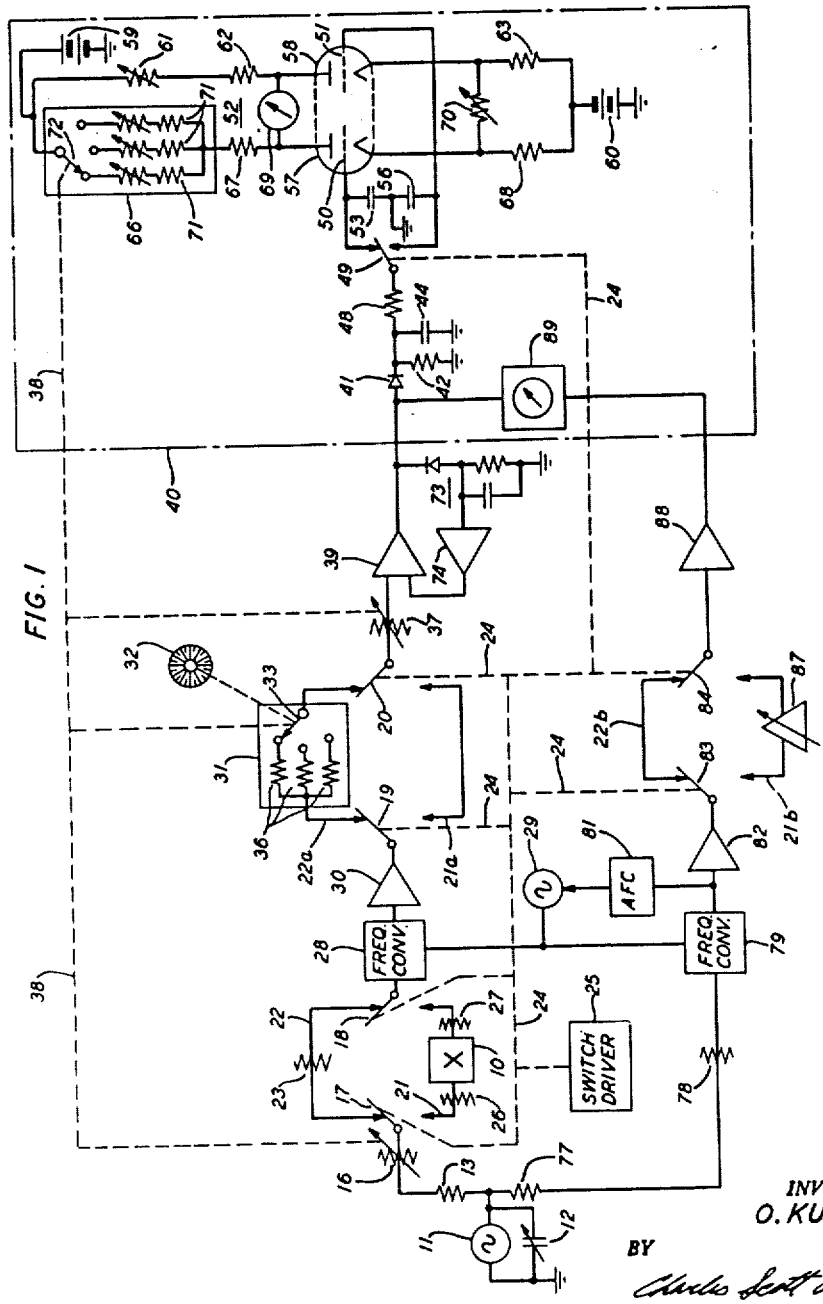
FIG. 1 is a circuit diagram, partially in schematic form and partially in block-and-line diagram form, illustrating a transmission phase and loss measuring set embodying the invention.

In FIG. 1, the transmission loss and phase of a circuit device 10, such as a transistor, are to be determined by applying high frequency test signals from a source 11 to the device 10 in the illustrated measuring circuit. The signal source 11 may be adjusted in frequency, as schematically indicated by the adjustable capacitor 12 connected across the source. In one application of the invention the test frequency band of interest covered five and one-half octaves in the megacycle range. The signals are applied for transmission loss measurements through a fixed resistor 13 and an adjustable resistor 16 to the armature of a switch 17, which is one of a plurality of synchronously operated switches in the test set. Resistor 13 provides proper terminating resistance for applied signals, and resistor 16 is connected across the signal path for setting signals within the linear operating range of device 10.

Switch 17 and its companion synchronously operated switches 18, 19, and 20, may, for high frequency applications, be glass-encapsulated, mercury relays enclosed in 50-ohm coaxial cavities. These switches are operated in synchronism, as schematically indicated by broken lines 24, at a relatively low frequency such as 60 cycles per second. Any suitable operating means 25 may be employed for driving the switches in synchronism.

Switches 17 and 18 alternately connect in the test signal circuit a first circuit path 21 including device 10 and a second circuit path 22 including a fixed standard resistor 23. Resistor 23 is assigned a resistance which is equal to the total resistance of two resistors 26 and 27 in the path 21 so that these two paths have equal attenuation except for the test device 10 connected in path 21.

Test signals are then applied from switch 18 to a frequency converter 28 which also receives beat frequency oscillations from a source 29. Converter 28 produces a fixed intermediate frequency which is applied to the intermediate frequency portion of the test signal path. Switches 19 and 20 operate in synchronism with switches 17 and 18 and alternately connect circuit paths 21a and 22a to receive test signals from converter 28 through an amplifier 30. Path 21a is a simple strap, whereas path 22a includes an adjustable attenuator 31 with various indicating dials schematically represented by the dial 32 in the drawing. Manipulation of this dial actuates a selector arm 33 for connecting one of the attenuator resistances 36 in signal path 22a.

Although attenuator 31 is schematically represented as a simple resistance selection network, it is to be understood that this attenuator may operate at an intermediate frequency such as, for example, one megacycle, and may include an extensive network of resistor combinations permitting a wide variety of step-by-step in-circuit resistance selections. Furthermore, the various circuit elements included in attenuator 31 are all adapted for use at high frequencies and the switching mechanism is, of course, appropriately designed for this purpose. The details of such designs are not shown, since such details are only indirectly related to the invention in that the necessity for correcting calibration errors in such an adjustable device to be used at high frequencies stimulated the invention.

Figure 2:
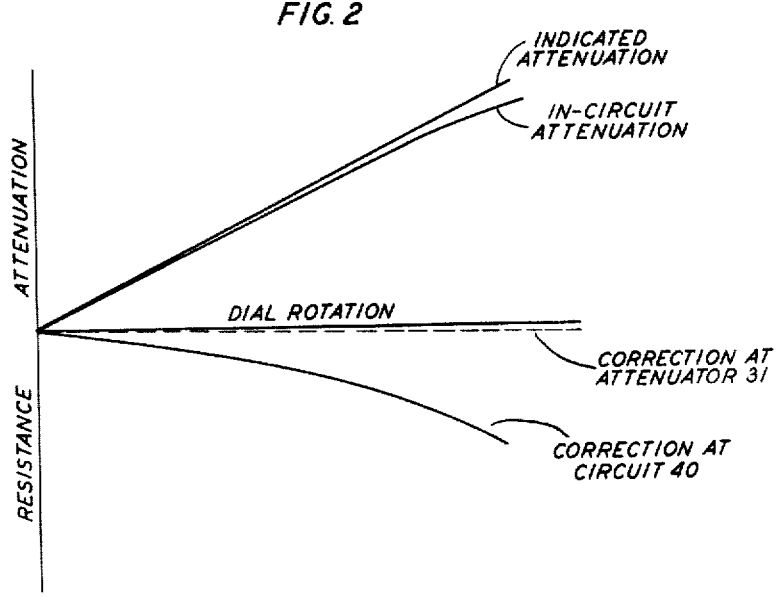
FIG. 2 is a composite attenuation and resistance diagram illustrating the operation of the invention.

It is, of course, well known that adjustable standard attenuators, such as attenuator 31, are normally plagued by discrepancies between the attenuation indicated by dial 32 and actual in-circuit attenuation. These discrepancies may vary in magnitude, for example, from a full decibel of attenuation down to small fractions of a decibel, depending upon the setting of dial 32. The attenuation-versus-dial-rotation portion of FIG. 2 is an illustrative comparison between indicated and in-circuit attenuations. Other resistances, such as the adjustable resistor 16 in the high frequency portion of the test path and another adjustable resistor 37 in the intermediate frequency portion of the test path, are ganged together with attenuator 31, as indicated by the broken lines 38 in FIG. 1, for simultaneous adjustment. Resistors 16 and 37 are not actually part of the network of attenuator 31; they are connected as shown to maintain a relatively constant total loss between resistor 13 and an amplifier 39 for all settings of attenuator 31.

Figure 3:
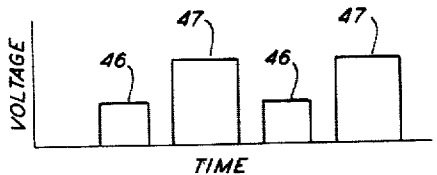
FIG. 3 is a voltage wave diagram illustrating the operation of the invention.

An amplifier 39 is provided to raise the level of the low frequency test signals after they have been subjected to attenuation by device 10 and by attenuator 31. The output of amplifier 39 is applied to a measuring circuit 40. In accordance with one aspect of the invention, a diode 41, a resistor 42 and a capacitor 44 constitute an envelope detector circuit for extracting from the test signals the direct-current component thereof. The extracted envelope may have the appearance illustrated, for example, in FIG. 3, wherein the pulses 46 may represent test signals as transmitted through the first signal path portions 21 and 21a, while the pulses 47 indicate test signals after transmission through the second signal path portions 22 and 22a. In the illustration of FIG. 3, attenuator 31 is set too low and must be adjusted for higher attenuation in order to reduce transmission and obtain a balance between the amplitudes of the pulses transmitted through the two test path portions.

The signals of FIG. 3 are transmitted through switch 49 to the control grids 50 and 51 of a difference amplifier 52. Capacitors 53 and 56, which are connected between ground and grids 50 and 51, hold grid signal levels substantially constant during switching intervals. Two triode elements 57 and 58 in amplifier 52 are supplied with operating potential from the batteries 59 and 60. Potential is supplied to triode 58 through anode resistors 61 and 62 and a cathode resistor 63. Potential is similarly supplied to triode 57 through an adjustable resistance network 66 and a resistor 67, as well as through a cathode resistor 68. An indicating meter 69 is connected between the anodes of triode elements 57 and 58. Resistor 61 may be adjusted to set the initial zero-balance condition for meter 69 as it well known in the art. An adjustable resistor 70 connected between the cathodes of triodes 57 and 58 is provided for setting the deflection sensitivity of the measuring circuit 40.

Resistance network 66 includes resistors 71 of different resistances, which may be selectively connected in the anode circuit of triode 57 by operation of a selector arm 72 which is ganged for co-ordinate operation with adjustments of attenuator 31, as schematically represented by the broken lines 38 joining selector arms 33 and 72.

Disregarding for a moment the resistor network 66, it will be observed from FIG. 1 that dial 32 may be adjusted to balance transmission through the test signal paths and to produce a balance indication on meter 69. When meter 69 indicates balanced transmissions, the test signal attenuation through the test path portions 21 and 21a is equal to the attenuation through the path portions 22 and 22a. The amount of this attenuation should be indicated by dial 32; but, as previously noted, the calibration of this dial has not yet been taken into account.

In accordance with the present invention, each of the resistors 71 in the measuring circuit 40 is designed to have a resistance which complements the resistance of a corresponding one of the resistors 36 in attenuator 31, so that when a balance indication is produced by meter 69 the indication on dial 32 truly represents the actual in-circuit attenuation presented by the device 10 under test. Thus, at each test frequency over the multioctave range covered by signal source 11, the attenuation of device 10 may be quickly determined by adjusting dial 32 until a balance is indicated by meter 69 in difference amplifier 52. No further corrections for calibration errors in attenuator 31 are required since resistance network 66 has automatically altered the gain of triode element 57 to take into account the calibration of attenuator 31.

Resistors 71 are located in a portion of the overall measuring system which is at a relatively high voltage level as compared to the rest of the system and at a low frequency compared to the rest of the system. The high voltage level location as compared to attenuator 31 makes it possible to employ combinations of stock resistors in network 66 to correct for the small calibration errors in attenuation of attenuator 31. The resistance-versus-dial-rotation part of FIG. 2 contrast the large resistances that may be inserted at network 66 with the small resistances required at attenuator 31 to correct for the calibration errors in attenuator 31. Furthermore, the low frequency location of resistors 71 in a direct-current portion of the measuring system makes it a relatively simple matter to employ trimming resistances in network 66 to adjust resistors 71 to match any changes in the calibration of attenuator 31.

An automatic volume control circuit may be added as a refinement to the loss measuring portion of the system of FIG. 1. It was found that when a broad band of test frequencies is employed the amplitude response of frequency converter 28 may not be uniform over the band. This effect causes no difficulty with respect to any one particular reading, since the measurement is obtained by a difference indicating process. However, over the band of interest the changing response of converter 28 also causes a change in the sensitivity of measuring circuit 40. In order to correct this situation, an automatic volume control loop is provided for amplifier 39. This loop includes a long-time-constant peak detector circuit 73 and another amplifier 74 coupling the output of amplifier 39 back to the input thereof. The time constant of peak detector circuit 73 is made to be long compared to the period of a switching cycle for the synchronously operated switches 17–20. With this arrangement, the largest one of the test signal bursts from paths 21a and 22a is automatically fixed at a certain voltage level, and attenuation adjustments are carried on from there. Accordingly, the sensitivity of measuring circuit 40 is maintained relatively constant over the band of interest.

It was noted at the outset that the circuit of FIG. 1 performed both loss and phase measurements. The loss measuring portions of the circuit have been described, but some of those portions are also utilized in performing phase measurements. Test signals from source 11 are applied through fixed resistors 77 and 78 to a reference frequency converter 79, which functions in a manner similar to converter 28 for stepping down the test frequencies to a fixed intermediate frequency. The output of converter 79 is applied through an automatic frequency control circuit 81 to adjust beat frequency oscillation source 29 for maintaining the intermediate frequency constant regardless of changes in the output frequency of source 11. An automatic frequency control circuit of the type shown in the United States Patent No. 2,743,362, of D. Leed, which issued April 24, 1956, has been found to be suitable for circuit 81.

The output of converter 79 is also applied through an amplifier 82 and additional synchronously operated switches 83 and 84 to two further test signal paths 21b and 22b. Switches 83 and 84 are operated in synchronism with the previously mentioned switches 17–20, and 49. Path 21b includes a suitable adjustable phase standard 87 and path 22b is an electrical strap. The outputs of test paths 21b and 22b are combined by switch 84 and coupled through an amplifier 88 to one input of a phase comparator 89. The other input of comparator 89 receives signals from the output of amplifier 39 in the loss measuring part of the test set. Comparator 89 indicates differences between phase differences measured in the 21-series of test path portions and the 22-series of test path portions. Phase differences between the test path 22b and the test paths 22 and 22a are compared with phase differences between the test path 21b and the paths 21 and 21a.

Phase standard 87 in path 21b is adjusted until the phase difference indicated by comparator 89 for the 21-series is the same as the phase difference for the 22-series. Thus, when comparator 89 indicates such a balance, it is known that, if the phase shift through circuit portions 22 and 22a is equal to that through portion 22b, the phase shift through test device 10 is also the same as the phase shift through phase standard 87. This condition is dependent upon essentially zero phase shift through standard attenuator 31 since portion 22b is only a strap. It is thus clear that if any trimming were attempted in attenuator 31 in the intermediate frequency section of the test set to correct calibration discrepancies, such action would also alter the distribution of parasitic impedances in attenuator 31. This change would affect the phase shift characteristics of the attenuator at the intermediate frequency and thereby generate an error in the phase measuring portion of the test set. Since actual attenuation through attenuator 31 is not important to phase measurements as long as the changes in attenuation are not accompanied by changes in phase characteristics, no difficulties are created by making calibration corrections in amplifier 52.

In summary, the test set of FIG. 1 provides a dynamic calibration correction for the calibrations of attenuator dial 32, and this correction is automatically performed so that dial 32 indicates true in-circuit attenuation. The correction is performed without affecting any characteristics of standard adjustable attenuator 31, and the correction does not introduce errors in other dependent parts of the circuit. Calibration corrections are accomplished by controlling resistance network 66 in co-operation with adjustments of attenuator 31. By means of this co-operation, the relative gains of the two portions of difference amplifier 52 are inversely changed in such a way that a balance indication on meter 69 means that the actual attenuation through device 10 is the same as the attenuation indicated by dial 32.

Although the invention has been described in connection with a particular embodiment thereof, it is to be understood that other modifications and embodiments which would be obvious to one skilled in the art are included within the scope of the invention.

What is claimed is:

1. In combination in a measuring system, a calibrated adjustable standard attenuator with known discrepancies between its indicated attenuation values and its actual attenuation capabilities, means applying to said attenuator measuring signals of predetermined frequency, a difference amplifier having two output connections, an envelope detector, circuits including said detector connecting said amplifier to be driven by signals from said attenuator, an indicating meter arranged to be driven by potential differences between said output connections, impedance means adjustable to different impedance magnitudes each corresponding to a different one of said discrepancies, means connecting said impedance means in said amplifier to unbalance said output connections, and means adjusting said impedance means in concert with adjustments of said attenuator for complementing said actual attenuation with respect to said meter so that true indications are produced by said meter.

2. A test set for measuring the transmission through an electric circuit, said test set comprising a calibrated, standard, adjustable attenuator, means applying test signals to said circuit and to said attenuator, means comparing the signal output from said circuit with the output from said attenuator, plural impedances selectively connectable in said comparing means, each of said impedances having a value selected to offset the effect in said comparing means of calibration error at one setting of said attenuator, and means selecting one of said impedances in conjunction with each adjustment of said attenuator.

3. A test set for measuring transmission through an electric circuit and comprising a source of test signals, a first circuit path including said electric circuit under test, standard transmission impedances having known calibration errors, a second circuit path including a portion of said impedances, means alternately applying said test signals to said first and second circuit paths, a third circuit path receiving signals alternately from said first and second paths, balanced indicating means connected to said third circuit path and indicating differences in the amplitudes of transmisisons over said first and second paths, plural resistors, and means selectively connecting portions of said resistors in said indicating means in conjunction with each portion of said standard impedances, each of said resistor portions having a resistance which unbalances said indicating means by an amount which complements the actual impedance of a corresponding one of said standard impedances to the extent of the known calibration error therein to produce a true transmission indication for said electric circuit.

4. A test set for measuring attenuation in an electric circuit element and comprising a standard attenuator of known calibration, means applying alternating-current test signals to said circuit element and to said attenuator at a frequency at which parasitic impedances associated with said attenuator have significant effects upon the characteristics thereof, means adjusting said attenuator in discrete steps to balance the transmissions through said attenuator and said circuit element, detector means producing direct-current signals in response to alternating-current signals transmitted through said circuit element and said attenuator, a transmission balance indicator connected to receive said direct-current signals, plural calibration resistors each having a resistance adapted to unbalance said indicator means by an amount offsetting the calibration error of one step of said attenuator, and said adjusting means including means connecting in said indicator a different one of said resistors for each of said steps.

5. A circuit for measuring loss and phase transmission characteristics of an electric current conducting material and comprising a first path including said material, an attenuator of known calibration and substantially flat phase response over the frequency band of interest, a second path including said attenuator, a calibrated phase standard, a third path including said phase standard, means applying test signals of adjustable frequency to said paths, a phase difference comparator indicating differences in the phase of transmissions through said second path as against transmissions through said first and third paths, balanced loss-indicating means receiving the outputs of said first and second paths, means adjusting said attenuator in steps to produce an indication in said loss-indicating means of equal attenuation in said first and second paths, a calibrated dial on said attenuator for indicating the amount of in-circuit attenuation without correction for known calibration errors, a plurality of resistors selectively connectable in said loss-indicating means for unbalancing the same by different amounts, the resistance of each of said resistors being of such magnitude that it produces an amount of unbalance corresponding to the calibration correction of said attenuator in one of its adjusting positions, and means operable in conjunction with said adjusting means connecting in said indicating means the resistor corresponding to each step of said attenuator.

6. In a circuit for measuring the transmission of a device over a broad frequency range, a source of test signals, a first conduction path including said device, a second conduction path including an adjustable standard attenuator of known calibration, said paths having individual high and low frequency portions and an intermediate common portion for stepping down high frequencies to low frequencies, said device being connected in the high frequency portion of said first path and said attenuator being connected in the low frequency portion of said second path, said common portion including frequency converting means having unequal response over the frequency band of interest, an amplifier receiving the outputs of said first and second paths, switching means alternately connecting the high frequency portions of said first and second paths between said source and said common portion and also synchronously and alternately connecting said low frequency portions between the output of said common portion and the input of said amplifier, automatic volume control means having a time constant which is much longer than the period of one cycle of operation of said switches, said automatic volume control means being connected for adjusting the gain of said amplifier to offset said response inequalities, means indicating the relative amplitudes of transmissions from said two paths, adjustable resistance means connected in said indicating means, and means adjusting said resistance means in concert with adjustments of said attenuator for complementing transmission effects of said attenuator to the extent of calibration errors in said attenuator.

7. A circuit for measuring transmission through a device over a predetermined range of frequencies, said circuit comprising a source of test signals of adjustable frequency, an adjustable attenuator with dial means indicating in-circuit attenuation at each setting of said attenuator, said dial means having predetermined calibration errors, means indicating relative voltage levels at two different input connections, circuit means coupling said signals to said inputs through said device and said attenuator, respectively, and resistor means in said indicating means, said resistor means comprising plural resistors selectively connectable in said indicating means in conjunction with the adjustment of said attenuator to offset calibration errors at each of said attenuator settings.

8. The transmission measuring circuit in accordance with claim 7, in which said indicating means comprises a difference amplifier having first and second triode translating elements, means connecting the control electrodes of each of said elements to said two inputs respectively, means including said resistor means supplying operating potential to the remaining two electrodes of one of said elements, a meter connected between the anodes of said two elements, and said supplying means including an adjustable resistor connected for zero-balancing said meter.

9. A circuit for measuring transmission through an electric device and comprising a source of alternating-current test signals, an adjustable attenuator with dial means indicating in-circuit attenuation at each setting thereof, said attenuator having predetermined calibration errors in the setting of said dial, a difference amplifier comprising two vacuum tubes, each of said tubes having at least an anode, a cathode, and a control grid, means supplying operating potential to the anode-cathode circuits of said tubes, and zero-adjusting means arranged to balance the outputs of said triode elements in response to equal input signals on the control grids thereof, means connecting said device and said attenuator to apply test signals over essentially different transmission loss paths, respectively, to the control grids of said tubes, adjustable resistor means connected in circuit with the anode-cathode path of at least one of said tubes, and means adjusting said resistor means in step with adjustments in said attenuator to unbalance said amplifier by an amount corresponding to the calibration error at each of said settings for reducing the effect of said errors.

10. A measuring circuit in accordance with claim 9, in which said connecting means includes an envelope detector common to the outputs of both of said paths for producing direct-current signals representing the transmission level at the output of each path, and means applying the output of said detector to said control grids.

11. The measuring circuit in accordance with claim 10, in which said connecting means further comprises synchronously operating switches coupling signals from said source to said detector over said paths in alternation, and additional switches operating in synchronism with the first-mentioned switches and applying said direct-current signals alternately to said control grids.

12. The measuring circuit in accordance with claim 9, in which said calibration errors are relatively small compared to in-circuit attenuation at each of said attenuator settings, respectively, and said connecting means includes an amplifier coupling signals from the outputs of said paths to said difference amplifier.

13. In an electric measuring circuit wherein a first impedance element is adjusted in steps to produce a predetermined meter indication and the measurement result is obtained from calibrated indicating means coupled to said element and having calibration errors of known magnitudes, the improvement which comprises a second impedance element also adjustable in steps in co-operation with said first element, means connecting said second element in circuit with said meter, and the impedance of said second element in each of its steps producing a deviation in the operation of said meter to offset the effect of said calibration errors.

14. A test set for measuring transmission through a circuit device and comprising a source of alternating-current test signals of adjustable frequency, an adjustable attenuator with dial means indicating in-circuit attenuation at each attenuator setting, said attenuator having predetermined calibration errors in said dial indications, a difference amplifier comprising two triode vacuum tubes, means supplying operating potential to the anode-cathode circuits of said tubes, and zero-adjusting means arranged to balance the outputs of said triode elements in response to equal inputs on the control grids thereof, indicating means coupled to said triode outputs, means connecting said device and said attenuator to apply test signals over essentially different transmission loss paths, respectively, to the control grids of said triodes, and means changing the relative gains of the two triode circuits of said difference amplifier by an amount such that, when balanced gain is indicated by said indicating means, the attenuation of said device is equal to the attenuation indicated by said dial means.

15. A circuit for measuring transmission through an electric device, said circuit comprising a source of test signals, an adjustable attenuator with dial means indicating in-circuit attenuation at each setting thereof, said attenuator having predetermined calibration errors in the settings of said dial means, an amplifier, means connecting said device and said attenuator to apply test signals over essentially different transmission paths to said amplifier alternately, indicating means operatively coupled to the output of said amplifier for receiving amplified signals from said paths, and said indicating means including means compensating operation of said indicating means to offset each of said calibration errors at each of said settings.

16. A test set for measuring attenuation in an electric circuit element, said circuit comprising a standard adjustable attenuator having a known calibration correction at each setting thereof, means applying alternating-current test signals to said circuit element and to said attenuator at a frequency at which parasitic impedances associated with said attenuator have significant effects upon the transmission characteristics thereof, means adjusting said attenuator in discrete steps to balance the transmissions through said attenuator and said circuit element, phase indicating means coupled to receive signals from said circuit element and said attenuator, detector means producing direct-current signals in response to alternating current signals transmitted through said circuit element and said attenuator, a signal level balance indicator connected to receive said direct-current signals, plural adjustable calibration resistors each settable to a resistance which is adapted to unbalance said indicator means by an amount offsetting the calibration correction at a different step of said attenuator, and said adjusting means including means connecting in said indicator a different one of said resistors for each of said steps.

References Cited by the Examiner
UNITED STATES PATENTS

| | | | |
|---|---|---|---|
| 2,047,782 | 7/1936 | Jensen | 324—57 X |
| 2,324,215 | 7/1943 | Kinsburg | 324—57 |
| 2,685,063 | 7/1954 | Alsburg | 324—57 X |
| 2,697,203 | 12/1954 | Shepard | 324—57 |
| 2,755,436 | 7/1956 | Heinz | 324—57 |
| 2,951,200 | 8/1960 | Critchlow | 324—57 |
| 3,005,156 | 10/1961 | Hoberman | 324—115 |

FOREIGN PATENTS 779,046  7/1957  Great Britain.

WALTER L. CARLSON, *Primary Examiner.*

SAMUEL BERNSTEIN, *Examiner.*

A. E. RICHMOND, E. E. KUBASIEWICZ,
*Assistant Examiners.*